United States Patent
Bill (10) Patent No.: US 10,197,124 B2
(45) Date of Patent: Feb. 5, 2019

(54) AIRCRAFT BRAKE COOLING FAN CONTROL SYSTEM

(71) Applicant: Airbus Operations Limited, Bristol (GB)

(72) Inventor: Andrew Raymond Bill, Bristol (GB)

(73) Assignee: Airbus Operations Limited, Bristol (GB)

(*) Notice: Subject to any disclaimer, the term of this patent is extended or adjusted under 35 U.S.C. 154(b) by 0 days.

(21) Appl. No.: 15/173,167

(22) Filed: Jun. 3, 2016

(65) Prior Publication Data

US 2016/0356331 A1    Dec. 8, 2016

(30) Foreign Application Priority Data

Jun. 4, 2015 (GB) .................................. 1509728

(51) Int. Cl.
    *F16D 65/847*      (2006.01)
    *H02P 1/42*      (2006.01)
    (Continued)

(52) U.S. Cl.
    CPC .......... *F16D 65/847* (2013.01); *F04D 25/08* (2013.01); *F04D 27/008* (2013.01); *H02P 1/42* (2013.01); *H02P 1/54* (2013.01); *H02P 29/60* (2016.02)

(58) Field of Classification Search
    CPC ....... Y02T 50/823; B64C 25/42; B64C 25/44; B64C 25/405; B60T 5/00; B60T 7/12;
(Continued)

(56) References Cited

U.S. PATENT DOCUMENTS 3,251,437 A * 5/1966 Moyer .................... F16D 55/40
                                                   188/264 AA
3,301,357 A * 1/1967 Cussons .................. B60B 19/10
                                                   188/264 AA
(Continued)

FOREIGN PATENT DOCUMENTS

AU      2012101825      2/2013
CN      102951032    *   3/2013
(Continued)

OTHER PUBLICATIONS

Englished machined translation of Cn-102951032, Description only.*
(Continued)

*Primary Examiner* — Robert A. Siconolfi
*Assistant Examiner* — San M Aung
(74) *Attorney, Agent, or Firm* — Nixon & Vanderhye P.C.

(57) ABSTRACT

An aircraft includes a power source arranged to provide AC electrical power of varying frequency, and a brake cooling fan including an impeller which is driven by an electric motor powered by said AC electrical power for cooling brakes of the aircrafts wheels. The brake cooling fan has an operable mode when the frequency of said AC electrical power meets certain criteria indicating that the frequency of the AC power is suitable for powering the motor, and an inoperable mode to protect against unsuitable operation of the motor. The brake cooling fan may then be safely powered with AC power direct from a wild frequency power network on the aircraft without needing a power inverter or constant power supply generator.

21 Claims, 5 Drawing Sheets

(51) Int. Cl.
*H02P 1/54* (2006.01)
*H02P 29/60* (2016.01)
*F04D 25/08* (2006.01)
*F04D 27/00* (2006.01)

(58) Field of Classification Search
CPC ... B60T 7/122; B60T 8/00; B60T 8/17; B60T 8/1703; B60T 13/662; H02P 1/42; H02P 1/54; H02P 29/60; F16D 55/36; F16D 65/847; F16D 65/853; F16D 2065/781; F16D 2065/783; F16D 2200/0052; F16D 2121/02; F04D 25/08; F04D 27/008
USPC ............... 303/191; 318/59–61, 370–376
See application file for complete search history.

(56) References Cited

U.S. PATENT DOCUMENTS

| | | | |
|---|---|---|---|
| 4,592,452 A * | 6/1986 | Merle | F16D 65/847 188/264 AA |
| 6,615,958 B1 | 9/2003 | Baden | |
| 2007/0084682 A1* | 4/2007 | Griffith | B60T 8/00 188/156 |
| 2008/0084331 A1* | 4/2008 | Pradier | B60C 23/0413 340/945 |
| 2009/0152055 A1 | 6/2009 | Cox | |
| 2012/0104159 A1 | 5/2012 | Charles et al. | |
| 2013/0049366 A1 | 2/2013 | Seger et al. | |
| 2016/0334435 A1* | 11/2016 | Bidmead | G01P 3/489 |

FOREIGN PATENT DOCUMENTS

| | | | |
|---|---|---|---|
| CN | 102951032 A | * | 3/2013 |
| JP | 57028598 A | * | 2/1982 ............... H02P 5/60 |

OTHER PUBLICATIONS

Extended European Search Report cited in European Patent Application No. 16171831.7, dated Oct. 18, 2016 (7 pages).

* cited by examiner

AIRCRAFT BRAKE COOLING FAN CONTROL SYSTEM

RELATED APPLICATION

This application claims priority to United Kingdom (GB) Patent Application 1509728.0 filed Jun. 4, 2015, and the entirety of which is incorporated by reference.

BACKGROUND OF THE INVENTION

The present invention concerns the cooling of brakes on an aircraft by means of brake cooling fans. More particularly, but not exclusively, this invention concerns an aircraft including a brake cooling fan, and a method of cooling an aircraft wheel brake on an aircraft using a brake cooling fan. The invention also concerns an associated control system and an associated computer program product.

The performance of wheel brakes on an aircraft is affected by their temperature. Brake fade is exhibited at high temperatures for example. It is therefore often the case that an aircraft, particularly a commercial passenger aircraft, is prevented, for safety reasons, from taking off if the temperature of the brakes is too high, which if the aircraft has only recently landed may be the case. It is possible to improve aircraft turnaround times by reducing the time required for the brakes to cool down. Fans may be used to assist and accelerate the cooling process. In some aircraft, integrated brake cooling fans can be provided on the aircraft. An advantage of providing such fans on the aircraft is that cooling of the brakes by means of the fans may be started sooner than if external fans were used (which would of course require the aircraft to be stationary before such external fans could be used). A disadvantage of integrated brake cooling fans is that they add mass to the aircraft, which is undesirable. Not only do the brake cooling fans themselves add mass, but so also do the associated power and control systems, which include items such as power and control cabling/wiring, fan motors for driving the fans, and the equipment required to provide a suitable source of electrical power for the fan motors.

AU 2012/101825 is an example of a proposal of a portable brake cooling fan. Other means for cooling aircraft brakes, provided on-aircraft, are suggested in US 2009/152055 and U.S. Pat. No. 6,615,958.

The present invention seeks to mitigate one or more of the above-mentioned problems. Alternatively or additionally, the present invention seeks to provide an improved means of cooling brakes on an aircraft.

SUMMARY OF THE INVENTION

The present invention provides, according to a first aspect, an aircraft including: a power source arranged to provide AC electrical power of varying frequency, and a brake cooling fan including an impeller which is driven by an electric motor powered by said AC electrical power, wherein the brake cooling fan is arranged to have an operable mode when certain criteria are met, the criteria including whether the frequency of said AC electrical power is suitable for powering the motor, and the brake cooling fan is arranged to have an inoperable mode to protect against unsuitable operation of the motor.

According to a second aspect of the invention there is also provided a method of cooling an aircraft wheel brake on an aircraft, wherein the method includes a step of powering a brake cooling fan with AC power from the wild frequency power network on the aircraft whilst ensuring that the frequency of the AC power meets certain criteria.

According to a third aspect of the invention there is also provided control system configured to perform the function of the control system in accordance with any aspect of the present invention as claimed or described herein, including any optional features relating thereto.

There is also provided, according to a fourth aspect of the invention, a computer program product configured to cause, when the computer program is executed, a programmable control system to form a control system in accordance with any aspect of the present invention as claimed or described herein, including any optional features relating thereto.

There is yet further provided, according to a fifth aspect of the invention, a kit of parts comprising one or more brake cooling fans and a computer program product in accordance with any aspect of the present invention as claimed or described herein, including any optional features relating thereto.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Certain embodiments of the present invention relate to an aircraft including a power source arranged to provide AC electrical power of varying frequency which is, in use, used for powering a brake cooling fan. A brake cooling fan typically includes an impeller driven by an electric motor. The electric motor is powered by the AC electrical power. The brake cooling fan is arranged to have an operable mode and is also arranged to have an inoperable mode to protect against unsuitable operation of the motor. Whether the brake cooling fan is in its operable mode depends on the frequency of the AC electrical power. There may be certain criteria, for example set in advance of operation, which need to be met before the frequency of the AC power is deemed suitable for powering the motor. For example, if the frequency of the AC power is so high that there is a risk of over-running, and possibly damaging, the brake fan, the brake fan may be placed in an inoperable mode, thus preventing operation and preventing the high frequency AC power from damaging the fan. The speed of the fan may increase with increasing frequency of supplied AC power. If the fan runs too fast, it may over-heat, and also, it may run so fast that any impeller failure might not be safely contained.

In certain embodiments of the invention, the AC power, of variable frequency, may directly power the motor of the fan. This may be of benefit, if the aircraft does not have an electric AC power network of constant frequency. In certain aircraft of the prior art, a constant frequency power bus is supplied to the whole aircraft via constant speed drive units which are mounted directly to the aircraft engines. Such an arrangement adds undesirable extra mass. An arrangement that would present an alternative solution to the present invention (particularly in relation to an aircraft without an AC power network of constant frequency) would be to provide on-aircraft brake cooling fans powered by converting the AC power of variable frequency to DC power to AC power of fixed frequency. The equipment required to convert from the AC power, of variable frequency, to AC power of fixed frequency, such equipment comprising many inverters for example, would however be bulky and massive. Embodiments of the present invention allow for the omission of such equipment (e.g. power inverters or fixed frequency power supply sources), resulting in a lower mass solution for on-board aircraft brake cooling fans.

It may be that the power source comprises an AC generator (for example an alternator) that is driven by an engine of the aircraft. The power source may be positioned so as to be local to the engine. When operating, the electric motor of the fan may draw power directly from the power source, in the sense that there are no electronic components that are provided specifically for the purpose of regulating, converting or otherwise altering the frequency of the AC electrical power from the power source. It may be that the frequency of the electrical power supplied by the power source is directly dependent on the engine speed (typically a linear proportional relationship).

It may be that a brake cooling fan may be "armed" (i.e. ready for operation, so therefore in an operable mode) or "disarmed", or "disabled", (i.e. prevented from being operated, so therefore in an inoperable mode). It will therefore be appreciated that in certain embodiments the brake cooling fan when in operable mode is not actually operating (it is merely armed and ready for operation). In other embodiments the default arrangement may be that a brake cooling fan in the operable mode should be operating.

It may be that the brake cooling fan may be placed in the operable mode, the inoperable mode, but no other mode. It may be that if the AC electrical power meets the above-mentioned certain criteria (and optionally other criteria) the brake cooling fan is placed in the operable mode and if the AC electrical power does not meet those criteria (or optionally does not meet other criteria) the brake cooling fan is placed in the inoperable mode.

In certain embodiments of the invention, the arrangement of the brake cooling fan is such that when, and only when, certain criteria are met (indicating that the frequency of the AC power is suitable for powering the motor) it switches into operable mode. It may that when such criteria are met, the brake cooling fan starts to operate. Extra criteria may need to be met, for example whether a manual instruction has been issued (for example by operating a switch or button) to operate the fan(s), before a fan in the operable mode actually starts to operate.

The brake cooling fan may also be arranged such that when certain criteria are met it switches into an inoperable mode, such that it is prevented from starting to operate. It may be that when such criteria (for inoperability) are met the brake cooling fan is stopped, preferably immediately, and prevented from starting.

There may be a power line that supplies electrical power from the power source to the motor that drives the impeller of the fan. There may be one or more switches that are connected in series with such a power line. One or more switches may be provided in the form of solid state power switches or controllers (SSPSs). The power line may carry multiple phases of AC electrical power. The AC electrical power may for example be in the form of a 3-phase power supply. There may be multiple power lines supplying a motor (for example for the sake of redundancy). It may, in certain embodiments, be that one or more such switches have an "on" position corresponding to the operable mode and an "off" position corresponding to the inoperable mode. It may be that a switch, for example one that switches power to the fan on or off (e.g. an SSPS), may only be switched on when the fan is in operable mode, but may be switched off when the fan is in either the operable mode or the inoperable mode. In certain embodiments, brake cooling fans may be arranged to be operated only on command from a manually operated switch (if, and only if, the brake cooling fan is in the operable mode). One or more such switches may be manually controllable, for example by a pilot. In certain embodiments, brake cooling fans may be arranged to be automatically operated. Even in such embodiments, there may be one or more manual override switches provided. It will be appreciated that the electric motor will typically be located locally to, for example directly next to, the impeller of the brake cooling fan with which the motor is associated. The motor may be mounted in the axle of the wheel with which the brake being cooled is associated. The motor may be an induction motor, typically a three-phase induction motor.

The brake cooling fan will typically be installed on the aircraft, such that the fan is carried during normal operation of the aircraft. There may be data concerning whether or not brake cooling fans are fitted on the aircraft, such data being used as part of the criteria that dictates whether the fan is operated (or placed in operable mode) or the fan is disabled (or placed in the inoperable mode).

The AC power will typically be provided by one or more engines on the aircraft. The aircraft may have multiple engines that generate the AC power. The frequency of the electrical power will depend on the speed of the engine generating it. The one or more engines may comprise the main engines that are used to provide thrust for the aircraft. The aircraft may comprise an auxiliary power unit (APU). It may be that the AC electrical power that is used to drive the motor of a brake cooling fan is, at one moment during operation, provided by the APU (typically generating power of fixed frequency) and, at another moment (before or after), the AC electrical power is provided by one or more of the main engines. The fans may be powered, in certain circumstances, by a ground-based power unit. The fans may be arranged to be selectively powered by the power source on the aircraft that provides AC electrical power of varying frequency or by a different power source such as a ground-based unit (typically generating power of fixed frequency).

The criteria by means of which the brake cooling fan is arranged to have an operable mode may include whether or not the frequency is less than a maximum amount. The criteria by means of which the brake cooling fan is arranged to have an operable mode may include a time limit. For example, the operable mode may be declared only if the frequency is less than the maximum amount for a fixed period of time. It may be that the criteria by means of which the brake cooling fan is arranged to have an operable mode include whether or not the frequency has been less than a threshold amount for a certain period of time. The period of time may be a set period of time. The period of time may be equated to a fixed number (two or more) of cycles of assessing the criteria, for example when the apparatus used to assess the criteria are controlled and operated in dependence on a clock signal. The period of time may be more than 0.5 seconds and may possibly be more than 2 seconds.

The criteria may be tested by means of a specific test. For example, the decision to switch from inoperable mode to operable mode may be subject to a time delay, during which time delay the decision to switch from inoperable mode to operable mode may be revoked (cancelled) if the frequency then exceeds a threshold level. It may be that a fan is only operated (from a state of not operating) after a set time delay during which the criteria to be met are tested, and confirmed as met, several time during the time delay. It may be that the fan is not operated if during the set time delay the criteria are not met at least once. The criteria to be met may include not only one or more tests which indicate whether the frequency of the AC power is suitable for powering the motor, but also extra criteria, for example, such as whether a manual instruction has been issued to operate the fan(s) and/or whether an aircraft system deems the aircraft not to be on the ground. The decision to switch from the operable mode to the inoperable mode is preferably not subject to a time delay. The aircraft may be so arranged that the inoperable mode of the brake cooling fan is triggered if the frequency of the AC power is not suitable for powering the motor.

It may be that the inoperable mode of the brake cooling fan is triggered if the aircraft is not on the ground (or at least an aircraft system deems the aircraft not-on-ground).

It may be that the aircraft is so arranged that the operable mode of the brake cooling fan can only be triggered if the aircraft is on the ground. Sensors can deem whether or not the aircraft is on the ground. It may be that there are sensors (e.g. load sensors) for detecting whether each landing gear of the aircraft is on the ground. It may be that all such landing gear must be deemed on the ground before the whole aircraft is deemed to be on-ground. The aircraft may have an existing system that generates a signal that indicates whether the aircraft is on-ground or not.

There may be a control system that is arranged to control the brake cooling fan. The control system may be arranged to control whether the brake cooling fan is operable or inoperable. The mode of operation of the brake cooling fan may be set in dependence on an output of the control system. The control system may receive an electrical signal from which the frequency of said AC electrical power may be ascertained. Such an electrical signal may be used to determine which mode of operation of the brake cooling fan should be set. The electrical signal from which the frequency of said AC electrical power may be ascertained may be a digital signal representative of the frequency. The electrical signal from which the frequency of said AC electrical power may be ascertained may be a signal representative of the speed of rotation of an engine which is used to generate the power. In such a case, the frequency of the AC electrical power may be derived by means of multiplying the speed of rotation of an engine by a constant, which itself depends on the gearing, if any, between the rotary output of the engine and the rotary input into the generator (e.g. the driven alternator) that converts rotary motion into AC power. The control system may not only control whether a fan is in operable/inoperable mode, but also (possibly as an additional level of control) control whether or not the fan is actually operating, when in the operable mode.

In some embodiments, the aircraft may include a multiplicity of brake cooling fans. In some embodiments, all of the multiplicity of brake cooling fans are controlled together such that all fans are either in an operable mode, or in an inoperable mode. It may be that either all fans are "on" or all fans are "off". In some embodiments, at least some of the fans may be arranged for control independently of each other, for example each brake cooling fan (or small group, for example a pair, of fans) having an operable mode and an inoperable mode, which may be selected independently of the mode(s) selected for other brake cooling fans on the aircraft. Each fan, of the multiple fans, may be arranged in accordance with any aspect of the present invention as claimed or described herein, including any optional features relating thereto. There may be some fans that are not arranged in accordance with the present invention. It may be that two or more fans are arranged in groups (for example, in pairs), each group of fans being controlled independently of other fans not in that group. The fans in such a group may be controlled together. Certain embodiments provide at least one fan controllable independently of all the other fans. There may be at least five such fans on the aircraft.

The aircraft may include an electronic log provided to assist testing or maintenance of equipment on the aircraft. If and when there is a detection of a fault associated with a fan such a fault may be recorded in the log. A control system may both detect the fault, and record the fault in the log. Such faults may include faults with the fan or faults associated with those components that supply power to, or otherwise control, the fan. The type of fault may be recorded in the log. Whether or not there is a log, in the case where there are least some fans arranged for control independently of each other, each independently controllable fan is arranged so that it may be isolated from other fans so that a faulty fan is rendered inoperable independently of the operation or non-operation of other fans. Such a fault-induced state of inoperability may be latched (i.e. until such time as the fault-induced state of inoperability is reset). For example, it may be that a fan is latched in the inoperable mode for as long as there is a fault associated with that fan recorded in the log that has not been cleared. The electronic log may include historical data on such faults.

Certain embodiments of the present invention relate to a method of cooling an aircraft wheel brake on an aircraft. The aircraft may for example be in accordance with any aspect of the present invention as claimed or described herein, including any optional features relating thereto. The method includes a step of powering a brake cooling fan with AC power of varying frequency. The AC power may for example be supplied by the wild frequency power network on the aircraft. The method includes a step of ensuring that the frequency of the AC power supplied to the fan meets certain criteria, for example to ensure safe operation of the fan. It may be that the criteria are such that if met it can be safely assumed that the frequency of the AC power is suitable for powering a motor of the fan. It will be appreciated that the AC power may nevertheless be suitable for powering a motor of the fan, even if the criteria are not met, because the criteria may be set sufficiently cautiously (to guarantee a very high degree of confidence that the fans are operable only when safe and appropriate to do so).

It may be that the step of powering the brake cooling fan is performed such that the brake cooling fan is directly powered with AC power from the wild frequency power network on the aircraft, for example without there being any power inverter or other means which converts between AC power of different frequencies. The absence of such electronic components has the benefit of reducing mass that might otherwise be present on the aircraft. It may be that such direct powering of a fan with power from the wild frequency power network is only made possible or safe by means of the present invention, in which there is an active step of ensuring that particular criteria are met, which ensure that the frequency of the AC power supplied is appropriate.

It will be understood that the "wild frequency power network" on an aircraft is one which will typically include power generated from the engine(s) of the aircraft and has a frequency that is dependent on engine speed such that the frequency will vary over time depending on engine speed, and cannot therefore be guaranteed to be at a frequency usable by frequency sensitive equipment. It may for example be that it is possible for the frequency, when the engines are up and running (idling at least), of the power to vary by more than 20% (e.g. to exceed 120% of the frequency when the power generating engine(s) are idling). The frequency supplied by the wild frequency network may on occasion exceed 600 Hz. The frequency supplied by the wild frequency network may on occasion drop below 450 Hz. It may be that the operational range of the wild frequency network extends above and below the range of 400 to 700 Hz. It may be that the range of frequencies that a brake cooling fan can safely and reliably operate at is contained within a frequency range of 0 Hz to 600 Hz, and possibly contained within a frequency range of 300 Hz to 550 Hz.

Whilst brake cooling fans can be provided separately as and when required after landing (so as not to be carried by the aircraft during normal operations), the present embodiments have particular application in the case where the brake cooling fan is installed on the aircraft (and therefore carried by the aircraft during normal operations).

The aircraft may include a multiplicity of brake cooling fans, for example four or more. There may be ten or more fans. A commercial passenger aircraft, particularly the larger aircraft such as Airbus' A350 and A380 aircraft, will have many wheels with brakes that are provided with brake cooling fans. (The aircraft of the present invention may be a passenger aircraft sized, or otherwise configured, to carry more than 50 passengers.) When there are multiple fans, the method of the present invention may be performed such that each fan is powered by AC power from the wild frequency power network on the aircraft whilst ensuring that the frequency of the AC power meets certain criteria. It may be that in certain embodiments each of the brake cooling fans are powered and controlled in substantially the same way. It may be that in certain embodiments each of the brake cooling fans are powered and controlled in different ways, for example independently of each other, but otherwise preferably in accordance with the present invention.

There may be a step of controlling one or more of the brake cooling fans, independently of one or more of the other brake cooling fans. The step of controlling one or more of the brake cooling fans, independently of one or more of the other brake cooling fans, may include rendering inoperable (e.g. disabling or stopping operation of) one or more of the brake cooling fans, independently of one or more of the other brake cooling fans, which are operated. The step of rendering inoperable the fan(s) may for example be effected by means of a positive instruction. There may be a step of detecting that one or more of the brake cooling fans, or parts associated therewith (for example, a switch that selectively provides power to a motor of the fan motor or isolates the power from the motor), are faulty, and then disabling operation of the one or more of the brake cooling fans independently of other of the brake cooling fans.

The method may include a control system controlling one or more of the brake cooling fans, independently of one or more of the other brake cooling fans, in dependence on input data received by the control system. The input data may include data (such as signals or the like) from an input provided by a pilot command (such as a brake fan control switch). The input data may include data that states whether or not the aircraft is on the ground. The input data may include data that states whether or not a brake fan system is installed on the aircraft. The input data may include data on the frequency of the electric power available to be drawn by a fan. The input data may include data concerning the temperature of the brake or brakes that are to be cooled by a given fan. Brake temperature data may be used, for example on a wheel by wheel basis, to cool the brakes in dependence on the temperature(s) measured. It may be that such temperature data is used to promote even temperature distribution. For example, hotter brakes may be cooled for longer, with other fans being rested. The duration of operation of a given fan may be logged and recorded, which may enhance maintenance and health monitoring of the fans, and associated parts.

The method may include a step of automatically operating a brake cooling fan, when certain criteria are met. For example, such criteria may include the AC frequency being below a threshold level, the aircraft being on the ground, and the ground speed of the aircraft being below a threshold level. Such criteria may include a test that assesses brake temperature, on a wheel by wheel basis.

The method may include a step of detecting a fault, for example including faults with the fan or faults associated with those components that supply power to or control the fan. The method may include a step of detecting a fault with the power supply equipment including for example a fault with a power switch. The method may include a step of detecting a fault with the motor associated with a fan, including for example a fault with its associated wiring. There may be a step of automatically recording a fault in electronic memory, for example to form a log. The current supplied to a fan may be monitored. In some cases more than one power line (for example in a 3-phase arrangement) may supply a fan, and so all such power lines may be so monitored. If the current falls outside expected levels, the method may deem there to be a fault. For example, if the fan is supposed to be inoperable, but significant current is being drawn by the fan, a fault may be present. (There may be a step of a control system detecting a fault including monitoring when the current to one or more fans, which according to the control system are not instructed to operate, exceeds a threshold level.) Also, if the fan is supposed to be operating, but insufficient current is being drawn by the fan, a fault may be present. (There may be a step of a control system detecting a fault including monitoring when the current to one or more fans, which according to the control system is being instructed to operate, drops below a threshold level.) If a fault is detected with an individual fan (or group of fans, not being all of the fans), including for example a fault associated with those components that supply power to or control the fan, the method may include a step of rendering inoperable the fan (and for example allowing other fans unaffected by the fault to be operable). The fact that a fan has been detected as being faulty may be recorded in a memory unit (for example non-volatile, non-transitory memory), for example in a log. The fan may be rendered inoperable if there is an associated fault so recorded. The fault may be recorded in a manner such that the record of the fault is only removed once there is a positive confirmation that the fault has been fixed. This may be provided by means of confirmation by a manual operator. It may therefore be that the electronic signal or data signifying a recorded fault is latched until the fault is cleared. The method may include monitoring for faults during operation of the fans. The method may include a step of generating a report of such faults.

The powering of a brake cooling fan, or otherwise the controlling of the fan, may include sending and/or receiving control signals, for example including signals comprising digital data. Such control signals may be transmitted over data channels or conduction paths across the aircraft. It may be that the aircraft is provided with an electronic data communications network, which is installed on the aircraft. The control signals may be transmitted and received using such a communications network. The data on the network may for example include information on engine speed and/or frequency of AC power from the wild frequency power network. The data on the network may for example include an indication of whether the aircraft is on the ground. The data on the network may include an indication of whether a brake cooling fan switch is in an "on" position or an "off" position. Data on the network may be used to assess whether or not to power the brake cooling fan with AC power from the wild frequency power network on the aircraft.

A computer system may be provided to perform at least some of the steps of the method. For example, the computer system may determine whether or not to power the brake cooling fan in dependence on data (including any or all of the types of data mentioned above) that is received. The computer system may include at least one processor and non-transitory memory storing instructions, e.g., a software program, and data that is processed by the at least one processor to perform some or all of the data processing steps described herein.

The electronic data communications network on the aircraft mentioned above may be a full duplex network. The network may be a packet-based switched network. The network may have built-in redundancy. The network may have determined network access characteristics. The network may have determined latency characteristics. The network may have determined bandwidth characteristics. The network may employ logical segregation of data flows. The network may be an Ethernet-based network (for example one based on the IEEE 802.3 standard). The network on the aircraft may be an avionics network specifically designed for aircraft use. Airbus has for example developed its own networking standard for handling of data in an aircraft, which is referred to by Airbus as "AFDX". Airbus' AFDX network is a switched full duplex network based on Ethernet network technology (based on the IEEE 802.3 standard). AFDX networks are typically fully compliant with Part 7 of ARINC 664 (one of the standards provided by Aeronautical Radio, Incorporated or "ARINC").

The term AFDX™ is used by Airbus as a trade mark but the technical characteristics of an AFDX network are well-defined and understood by those skilled in the art. The term "AFDX" alludes to the main characteristics of the network—i.e. one that is specifically designed for Avionics and is a Full DupleX network. Embodiments of the present invention may use an electronic data communications network on the aircraft in the form of an AFDX network.

There may be ancillary means to protect against unsafe operation of the fan. Such ancillary means may be independent of any means that might be provided to assess whether the frequency of the AC power is suitable for powering the fan. For example, the ancillary means may include a fail-safe mechanism to disable the fan. For example, a thermally sensitive bimetallic strip cut-out switch may be provided locally to the fan. The cut-out switch may be arranged to electrically isolate the fan if the strip reaches a certain temperature, thus protecting against the fan (including its motor) from overheating.

Above it is mentioned that a control system, such as a computer system, may be provided as part of embodiments of the invention. It will be appreciated that such a system, or at least the software that configures the system, may be made and/or provided separately from the aircraft on which it is installed. Such a control system may be configured to receive electronic data or other electrical signals concerning the frequency of the AC power. Such electronic data/other electrical signal may then be processed, in use, by the control system to generate output data or other signal which determines whether or not a brake cooling fan should be declared/rendered operable or inoperable. The mode of operation of the brake cooling fan (operable/inoperable) may be set in dependence on the output, for example.

A computer program product may be provided which is configured to cause, when the computer program is executed, a programmable control system to form a control system as mentioned above and/or in accordance with any aspect of the present invention as claimed or described herein, including any optional features relating thereto. The computer program product may for example be configured to cause a control system to test whether the frequency of the AC power meets certain criteria, and if so, to allow the brake cooling fan to be supplied with AC power.

According to certain embodiments of the invention, a kit of parts may be provided in order to convert an aircraft that is not in accordance with the present invention into one which is. Such a kit of parts may include one or more brake cooling fans. Such a kit of parts may include one or more components, which enable the brake cooling fan to have an operable mode an inoperable mode. Such a kit of parts may include a control system, as mentioned above. The control system may be configured by means of a computer program. The kit of parts may include such a computer program product, optionally independently of the control system. The kit of parts may include one or more power control switches for isolation of power from, or supply of power to, one or more fans.

Figure 1:
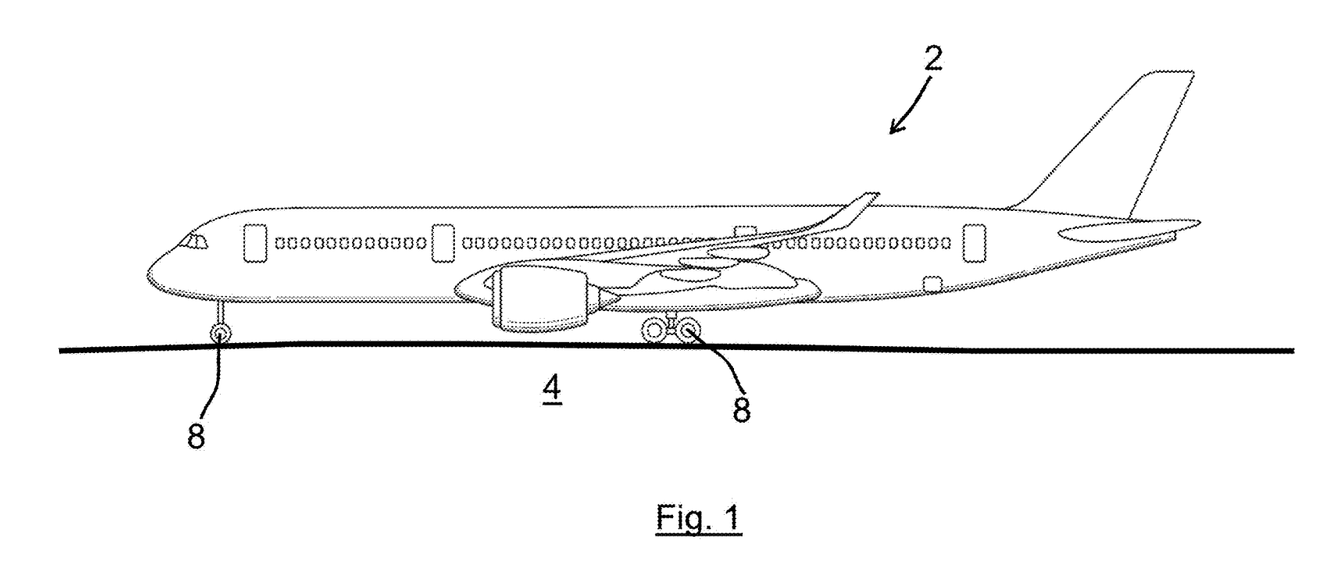
FIG. 1 shows an aircraft incorporating brake cooling fans and a control system according to a first embodiment of the invention.

There now follows a description of specific embodiments, including the first and subsequent illustrated embodiments. FIG. 1 shows, in accordance with a first embodiment, an aircraft 2 on the ground 4. The aircraft has wheels 8 which are in contact with the ground and have associated brakes. In this case, the aircraft has just landed and the aircraft wheel brakes are hot. Before the aircraft takes-off again, the brakes are typically allowed to cool down. This cooling process is accelerated, when the aircraft is on the ground, by using brake cooling fans on the aircraft to cool the brakes by blowing air, from the surrounding environment (e.g. ambient air in the atmosphere), over the brakes and/or their associated structure. As shown schematically in FIG. 2, each fan (represented by box 10) includes an impeller 12 which is driven by an electric motor 14. The motor 14 is in the form of an induction motor powered by three-phase AC electrical power 16 and under the control of a brake fan control system 20. The single control system 20 controls the operation of each of sixteen fans. The AC electrical power 16 that powers the motor 14 for each fan is drawn directly from the wild frequency power network of the aircraft.

Figure 2:
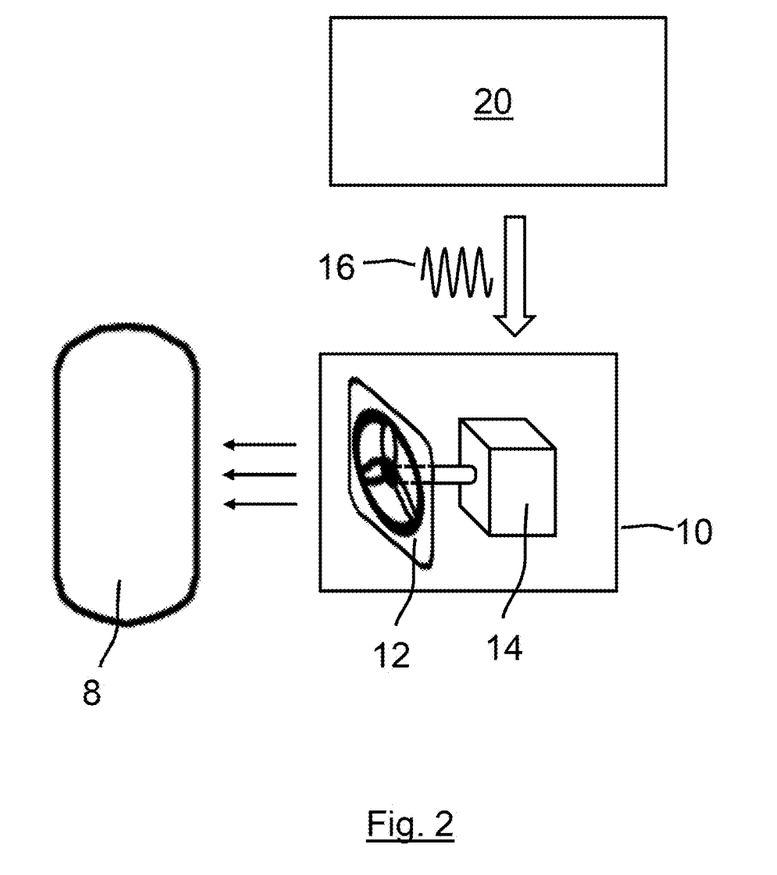
FIG. 2 is a schematic diagram providing an overview of the operation of the brake cooling fans and the control system of the first embodiment of the invention.

It will be understood that the wild frequency power on an aircraft is generated by alternators driven by, or integrated within, the engines on the aircraft, and that the frequency of the power delivered will therefore depend on the speed of the engine. The speed of each engine on an aircraft will typically vary according to operational requirements of the aircraft, without regard to the power frequency requirements of any equipment powered by electrical power drawn from the wild frequency network. The control system 20 only permits the brake cooling fan to operate when the frequency of the power on the wide frequency network is within a safe and suitable range of operation, in this case that being below 525 Hz. The lowest frequency of wild frequency power will be when the engine(s) are idling, which will typically result in frequencies between about 380 Hz and about 500 Hz, depending on various factors such as the type of engine. It may be that there are occasions when the electrical power provided on the wild frequency network is provided solely by one or more auxiliary power units (APUs) which are configured to provide power for the aircraft's systems and are not arranged to provide any thrust. The frequency of power provided by an APU is likely to have a narrower range of frequencies, for example in the range of 400 Hz to 415 Hz. Thus, whether electrical power is provided by the main engine(s) of the aircraft, or an APU, there is both an inherent lower limit on the frequency of power used by the induction motor and an upper limit, actively imposed by the control system 20. These upper and lower frequency limits thus impose, in practice, a range of power frequencies over which the fan motor 14 is operable. The induction motor(s) 14 operate efficiently, and without significant risk of overheating, provided that the power supplied is within such a range.

The equipment of the first embodiment may be used in a method of cooling an aircraft wheel brake on the aircraft. Once the aircraft has landed, the pilot may then operate a switch to activate the brake cooling fans 10 on the aircraft. Operation of the brake cooling fans 10 will however only be commanded if the control system 20 deems it appropriate to do so, in particular, depending on whether the frequency of the AC power on the wild frequency power network on the aircraft is less than 525 Hz. If it is, the control system 20 activates the cooling fans; otherwise, the fans 10 are prevented from operating. The fans are driven by induction motors 14 powered directly with power from the wild frequency network. There is no need therefore for an inverter, or other means for converting between the variable frequency on the wild frequency power network to DC or regulated AC power, to be provided for the fan(s). The absence of such inverters, or constant frequency power supply generators, provides a weight saving.

Figure 3:
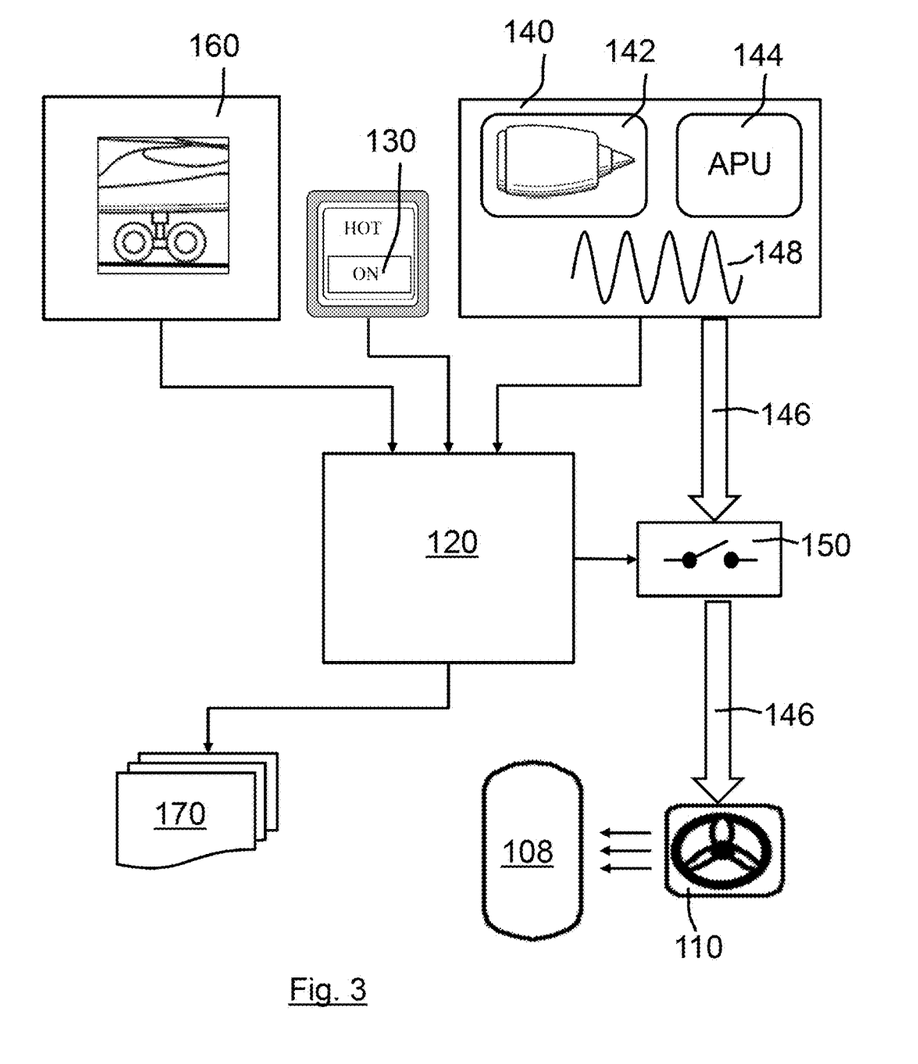
FIG. 3 is a schematic diagram providing an overview of the operation of the brake cooling fans and associated control system of a second embodiment of the invention.

FIG. 3 shows a landing gear monitoring system 120 according to a second embodiment. In this embodiment, the fans 110 include AC induction motors located within the axles of the braked wheels 108, each driving an impeller housed within a shroud assembly (not shown). The impeller draws air in through the wheel and brake assembly 108, exiting through the debris guard (not shown) mounted on the outer face of the wheel assembly. This cools the brakes quicker than natural conduction and radiation. The control of each brake cooling fan 110 (comprising both motor and impeller) is provided by the landing gear monitoring system 120, which also controls/monitors other aspects of the operation of the landing gear. The landing gear monitoring system 120 controls the brake cooling fans 110 in response to pilot requests issued by means of operating a brake cooling fan switch 130 in the flight-deck. The state of the brake cooling fan switch is indicated by a lamp on the switch 130. A memo on an electronic flight warning system page is also displayed to indicate to the pilot that the brake cooling fans are selected. This ensures manual detection of a failed brake cooling fan switch lamp. In this embodiment, the landing gear monitoring system 120 either issues an "on" command to all of the brake cooling fans 110 or issues an "off" command to all of the brake cooling fans 110. Fans are not able to be controlled independently of each other by the landing gear monitoring system 120.

In a manner similar to the first embodiment, inverters which would traditionally have been provided to supply a fixed power supply to the brake cooling fan motors are not present (their removal representing a weight saving opportunity). The brake cooling fan motors are connected directly to the wild frequency network, shown schematically in FIG. 3 as box 140, by means of a power line, illustrated schematically by arrows 146, which supplies 115V three-phase AC power. Power on the aircraft is typically supplied by the APU 144 (typically generating fixed frequency AC power), or by the wild frequency power network generated by the aircraft's engines 142, and therefore having a varying frequency. (In certain circumstances power may be provided to the fans by a ground power unit (or "GPU") which provides a source of fixed frequency AC power, typically of 400 Hz.) The AC induction motors can only safely be driven by power at frequencies between 360 Hz and 525 Hz. The nominal current frequency operating limits, when supplied by the aircraft engines (when idle) are between about 415 Hz to 500 Hz (engine type 1) or between about 390 Hz to 490 Hz (engine type 2). Idle speeds are exceeded at certain airfields during certain ambient conditions (hot and/or high altitude). It will be appreciated that a given model of aircraft (e.g. the Airbus A380) may be supplied with a set of engines of a given type selected from two or more options. Different engines will have different ranges of idling speeds, and the engine rotor speed to current frequency transfer function will depend on the engine type adopted. Whilst not illustrated in FIG. 3, the system takes account of the different engine types that can be fitted on the aircraft. The engine type is set in software to identify the engine type, which therefore dictates which frequency transfer function is utilised. Switches 150, in the form of Solid State Power Switches ("SSPS"s) are provided to switch AC power on or off under the control of the landing gear monitoring system 120. Each brake cooling fan utilises three SSPSs 150, with one SSPS per phase, thus allowing the brake cooling fan motors to operate on the 115V 3-phase AC supply.

The landing gear monitoring system 120 protects the fans 110 from over-speeding (which would otherwise occur at high frequencies) and also provides an improved means for fault localisation and brake cooling fan control automation.

Whilst not shown in FIG. 3, two independent control systems 120 are provided in order to provide redundancy, only one such system being shown in FIG. 3. Also, for purposes of resiliency the control system uses inputs having redundancy, using independent data from independent sensors, such that the risk of faulty data/signals causing improper operation of the fans is reduced.

Each landing gear monitoring system 120 receives various data which determines whether or not the instruction to operate/not operate the brake cooling fan 110 is issued. The data includes a signal from an aircraft control system 160 which indicates whether or not the aircraft is on the ground, and an indication of the frequency 148 of the power, which is directly derived from the engine rotor speed and engine type data (in this embodiment, power supply frequency information not being directly available to the landing gear monitoring system 120).

The system operates according to the following rules:

(I) If a fault is present which impacts correct global brake cooling fan operation (on or off), the landing gear monitoring system 120 will default to issuing an "off" command to the SSPS switches 150. Faults that will trigger an "off" command to all SSPS switches include any case where a signal becomes invalid and loss of data (including for example, data concerning the type of aircraft the system is installed on and any other data that is needed to correctly control the brake cooling fans). The SSPS switches 150 themselves default to an off position (i.e. the switches are open) in the absence of an "on" command. Thus, a failure of an individual SSPS will not impact any other brake cooling fans supplied with power via other SSPSs.

(II) All brake cooling fans will be switched on, from an "off" condition, if—

(IIa) The pilot has selected the cockpit Brake Fans switch (130)

(IIb) The aircraft is on-ground (to ensure that the brake cooling fans cannot inadvertently operate in flight); and (IIc) The frequencies of all brake cooling fan power supplies remain less than 500 Hz for a period of 5 seconds (or, if the brake cooling fans are being operated for the first time after landing, and the frequencies are less than 525 Hz) so that the fans may be safely directly powered by the AC power network 140.

All brake cooling fans will remain on if—

(I) The cockpit brake fans switch 130 remains "on";

(II) The aircraft remains on the ground; and (III) All brake cooling fan power supplies are less than 525 Hz;

(IV) The System will turn all brake cooling fans off instantly if any of the above conditions are false (i.e. without any confirmation time).

It will thus be seen that if the frequency exceeds 525 Hz, a hysteresis value of 500 Hz is used in conjunction with a 5 second confirmation time to turn the brake fans on (i.e. before an "on" command is issued after an off command has been issued, there needs to be a period of 5 seconds where all frequencies are below 500 Hz, so as to avoid rapidly switching between "on" commands and "off" commands.).

Figure 4:
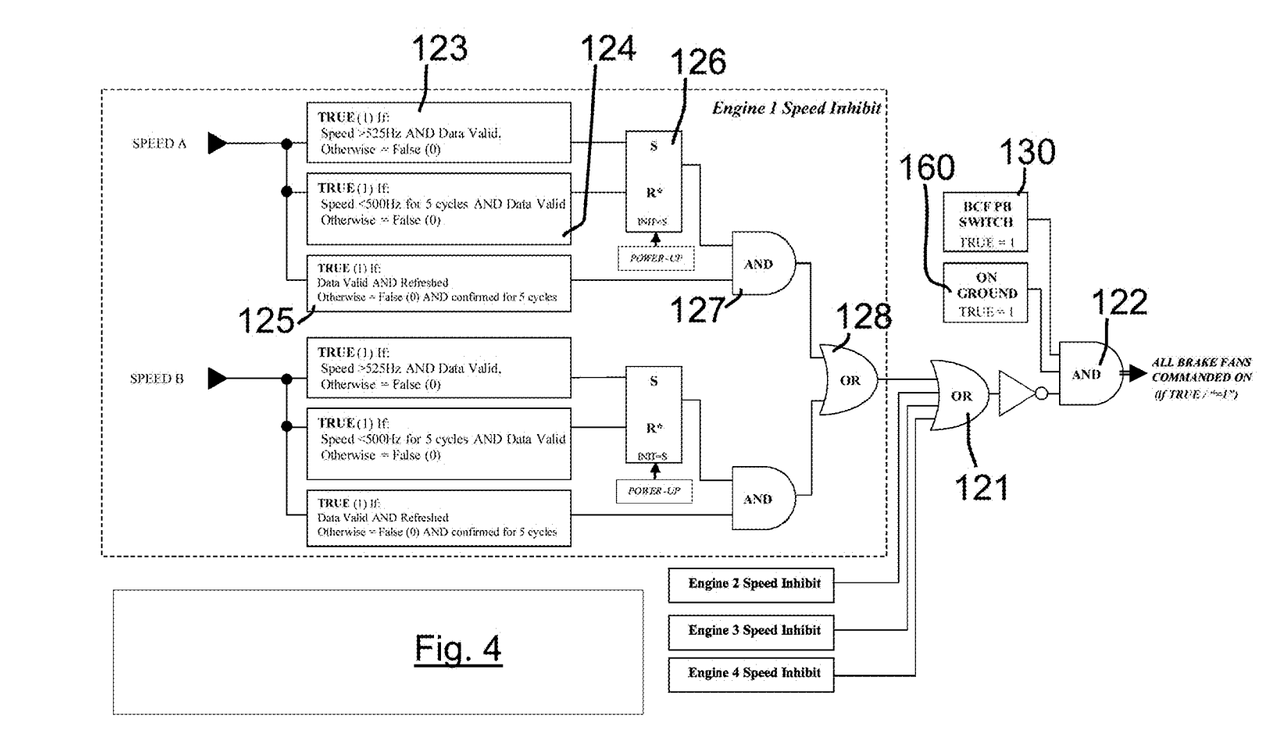
FIG. 4 is a schematic diagram showing the logic control used in part of the control system of the second embodiment of the invention.

FIG. 4 shows a logic gate arrangement that is used to put the above rules into practice. It will be seen that four "engine speed inhibit signals" are combined at an OR gate 121, which is followed by a NOT gate, the output from which is combined, with the signals from the pilot's fan switch 130 and the on-ground signal 160, at a final AND gate 122. If any one of the engine speed inhibit signals is TRUE ("1") then the corresponding input on the final AND gate 122 will be a FALSE ("0") meaning that the output from the final AND gate 122 will be also be a FALSE ("0"), resulting in the command to all brake fans to turn "off". Thus, only if all of the engine speed inhibit signals are FALSE ("0") AND the signal from the pilot's fan switch 130 is TRUE ("1") and the on-ground signal 160 is TRUE ("1"), will there be a command to turn all the brake fans "on". Each engine speed inhibit signal may thus be viewed as being equivalent to a signal indicating whether the fans should be operable (inhibit signal=FALSE) or inoperable (inhibit signal=TRUE).

Each of the four engine speed inhibit signals is generated in the same way, the details being shown for Engine 1 only in FIG. 4. It will be seen that redundancy is provided at this level by means of using two separate signals "SPEED A" and "SPEED B" to test whether the engine rotor speed (equated to the frequency of power) is suitable for powering the fans. It will be seen from FIG. 4, that for each measure of engine speed, three logic values are generated (see boxes 123 to 125). The speed is converted (by means of a linear relationship) into a power frequency. A first logic test (box 123) generates a TRUE ("1") signal if the frequency is greater than 525 Hz AND the data is deemed valid; otherwise a FALSE ("0") signal is generated. The signal from the first logic test (box 123) is received at the "set" input port ("S") of a set/reset latch 126. A second logic test (box 124) generates a TRUE ("1") signal if the frequency is less than 500 Hz for 5 seconds AND the data is deemed valid; otherwise a FALSE ("0") signal is generated. The signal from the second logic test (box 124) is received at the "reset" input port ("R*") of the set/reset latch 126. A third logic test (box 125) generates a TRUE ("1") signal if the data is deemed valid and up to date; a FALSE ("0") signal being generated if the data is deemed invalid/not up to date five times in succession. The set/reset latch 126 operates as in Table A below:

TABLE A

| SET (S) | RESET (R*) | OUTPUT | COMMENTS |
|---|---|---|---|
| 0 | 0 | Maintain Previous State | Enables BCF Operation |
| 0 | 1 | 0 | Enables BCF Operation |
| 1 | 0 | 1 | Inhibits BCF Operation |
| 1 | 1 | 0 | Not Possible |

On initial power-up, the signals received at the "set" input port ("S") and at the "reset" input port ("R*") are, in the absence of a valid received engine "speed" signal, FALSE ("0") signals and the output of the set/reset latch 126 is set to FALSE ("0"), such that fan operation commences if the brake cooling fan push button switch 130 is pressed and the on-ground signal 160 is TRUE.

The output of the set/reset latch 126 is combined at an AND gate 127 so that an "inhibit" signal from the set/reset latch 126 (a TRUE ("1") signal) is only acted on if the data is deemed valid and refreshed. An "OR" gate 128 ensures that a command to inhibit the operation of the fans produced by either of the two sets of logic gates associated with the two, respective, separate signals "SPEED A" and "SPEED B" is actioned; and that the brake cooling fans are allowed to be commanded "on" only if both sets of logic gates generate an "enable" signal, namely a FALSE ("0") output. The system 120 logs errors and other operational data, such as detected faults, in reports 170 stored in electronic memory.

Figure 5:
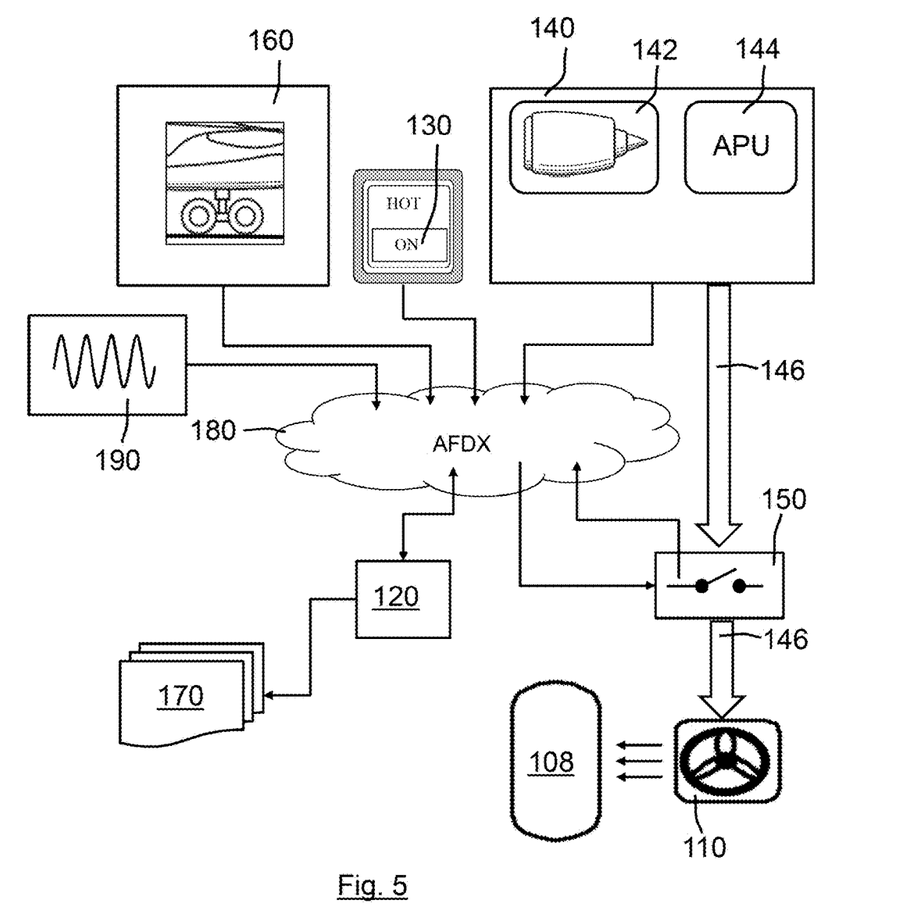
FIG. 5 is a schematic diagram providing an overview of the operation of the brake cooling fans and associated control system of a third embodiment of the invention.

FIG. 5 shows a landing gear monitoring system 120 according to a third embodiment. In this embodiment, the aircraft employs an on-board digital communications network 180 that facilitates the flow of control data and monitoring data between parts of the aircraft. In this case the network 180 is in the form of an Avionics Full-Duplex Switched Ethernet (AFDX) data network. Similar parts of this embodiment are labelled with the same reference numerals as used in the second embodiment. SSPS switches 150, providing power 146, to the brake cooling fans 110 are controlled via ON/OFF commands transmitted over the AFDX network as determined by the landing gear monitoring system 120, which employs brake cooling fan control logic in software.

In this embodiment, the system takes account of the brake cooling fans 110 being customer selectable options. A flag is set in software (optionally via pin programming) to identify that the aircraft has brake cooling fans fitted. FIG. 5 shows, schematically, the brake cooling fan configuration data representing whether or not fans are fitted as box 200. If the brake cooling fan configuration is not known (e.g. if no valid value is stored or set in memory, or there is a failure in the memory store), the brake cooling fan logic defaults to 'Not Fitted' and the landing gear monitoring system 120 defaults so as not to operate the brake cooling fans, although full system functionality may remain available from the other system (not shown) provided for redundancy. There is a "brake cooling fan fitted" flag that must be set to "True" for the functionality described below to work/be activated.

Data 190 concerning the frequency of the power on the wild frequency network is already pre-ascertained and available over the AFDX network 180. The landing gear monitoring system 120 does not therefore need to calculate the frequency from engine rotor speed.

The landing gear monitoring system commands, via the AFDX network, the brake cooling fan-SSPSs 150 to close and turn all brake cooling fans 110 on when all of the following conditions are met for a period of 10 cycles (equating to a time period of 4.8 seconds):

(I) The brake cooling fan option flag is set to "fitted", AND (II) The pilot has selected the cockpit brake fans switch 130, AND (III) All brake cooling fan power supplies are less than 525 Hz (box 190), AND (IV) The aircraft is on-ground (box 160)

If any of the above conditions are not met during the set time period, then the SSPSs 150 remain open, until such time as all conditions are met again for a sustained period of 10 clock cycles. The logic circuit arranged to test whether the above conditions are met for the set time period is preferably provided by means of a set of logic gates, the logic output of which is required to remain the same for the set-time period. This contrasts with the arrangement of the second embodiment (see FIG. 4) in which individual logic gates (for example, boxes 124, 125) require data to meet certain criteria for certain time periods. The inputs used by the landing gear monitoring system 120 are received over the AFDX network 190. It is assumed that the initial reading of the brake cooling fan option "Fitted" signal is correct and will not change during operation of the aircraft from powering up.

If any of the following conditions are met, the brake cooling fan logic the landing gear monitoring system 120 immediately issues a command to switch off the brake cooling fan motor SSPSs 150:

(I) The cockpit brake fans switch 130 is not "on", OR (II) Any brake cooling fan power supplies exceeds 525 Hz, OR (II) The aircraft is deemed not to be on-ground, OR (III) Data is deemed not to be valid.

Redundancy is supplied by mean of operating two landing gear monitoring systems in parallel which each receive two sets of independent inputs. A command from one or both such systems will be sufficient to operate the brake cooling fans.

In this embodiment, there are scenarios in which individual brake cooling fans (or pairs of cooling fans) are individually controllable, for example disabled from operation, even if other fans are operated. One such scenario is if the fan or motor is deemed faulty. Such faults may be detected when the current drawn by a motor, or set or motors, is outside a normal range of operation. The current supplied to a given motor, or set or motors fed by the same power line(s), is monitored at the SSPS switch 150 by the landing gear monitoring system 120 via the AFDX network 180. If the measured current from a set of brake cooling fan-SSPSs is greater than or equal to 1 A (for 20 complete cycles—e.g. 9.6 seconds), the landing gear monitoring system 120 transmits a "brake cooling fan running" bit (one bit per brake cooling fan-SSPS set), to the aircraft via the AFDX network 180. If the measured current from a set of brake cooling fan-SSPSs falls below 1 A, the "brake cooling fan running" bit is immediately set to zero (i.e. removed) and a "brake cooling fan fault" bit is set. Such activity is recorded in a log, which can be exported from the landing gear monitoring system 120 as part of the log report 170. By monitoring the current drawn by individuals motors, the landing gear monitoring system 120 is able to monitor (and log) which brake cooling fans 110 (and/or other parts of the associated equipment) are operating properly, and which are not, which can assist with maintenance and/or troubleshooting. If the brake cooling fan push button switch 130 is in the OFF position and the measured current from a brake cooling fan-SSPS is greater than or equal to 1 A, the landing gear monitoring system 120 will transmit a "brake cooling fan SSPS Fault" bit (one bit per brake cooling fan-SSPS set), to the aircraft via AFDX, once the failure is confirmed. Such a fault bit (indicating that brake cooling fans are operating when not requested) is removed once the brake cooling fan failure has been confirmed as cleared.

Since there are three SSPS switches per brake cooling fan, all three SSPS must be monitored to understand the full condition of the health of the SSPS and brake cooling fan system. For example, when the landing gear monitoring system 120 checks if the current supplied to a brake cooling fan is indicative of it running or not, for the monitoring system 120 to transmit a "brake cooling fan running" bit all three SSPS currents must exceed 1 A, otherwise the brake cooling fan can be said to be not running properly. If the current supplied via any of the three SSPS drops below 1 A, the "brake cooling fan fault" bit is set.

The landing gear monitoring system 120 is also provided with SSPS power supply information which is used by the system 120 for fault monitoring and to differentiate between brake cooling fan failures and electrical (e.g. SSPS) failures.

In this embodiment, a failure of an individual brake cooling fan motor/SSPS does not impact any other brake cooling fans/SSPSs (excluding its wheel-pair brake cooling fan). Any brake cooling fan related failure detected when the brake cooling fans are supposed to be operating is latched (i.e. recorded as such in non-volatile memory) when the brake cooling fans are de-selected (and remain latched until the fault is confirmed as cleared). This ensures that any fault is isolated until such time as a fault can be cleared and confirmed as cleared. A fault once detected causes the landing gear monitoring system 120 to render inoperable the individual brake cooling fan, for as long as the fault remains latched and not cleared.

When the landing gear monitoring system 120 detects a fault in the case when the fans are commanded "on" but the current being drawn via a corresponding SSPS switch is less than 1 A then it will be deemed that either the motor is faulty (if the voltage across the motor is deemed appropriate) or, in the alternative, that the SSPS switch is faulty. The SSPS switch will also be deemed as faulty, if it is detected that the associated brake cooling fan is inadvertently running when not required (namely when the fans are not commanded "on" but the current on the SSPS switch for any of the three phases exceeds 1 A).

The brake cooling fan push button switch 130 has various status. There is a white 'ON' indication which is provided on the brake cooling fan switch 130 when the switch is pressed (ON). There is an amber 'HOT' indication which is provided on the brake cooling fan switch 130, which aids the crew in identifying that the brakes are hot and that the brake cooling fans should be selected (if brake cooling fan option is fitted and the aircraft is on the ground).

Whilst the present invention has been described and illustrated with reference to particular embodiments, it will be appreciated by those of ordinary skill in the art that the invention lends itself to many different variations not specifically illustrated herein. By way of example only, certain possible variations will now be described.

There may be provided brake cooling fan logic which uses an input concerning brake temperature, which may for example lead to isolating a failed motor from being commanded on. Brake temperature, on a wheel by wheel basis, could also be used to aid even temperature distribution and turn-around times whilst reducing pilot actions pre/post flight. It could for example be that if the brakes have cooled to below 50 degrees Celsius, operation of the fan(s) associated with such brakes(s) is inhibited. Such steps may improve efficiency.

There may be a manual over-ride function that ensures that the fans are rendered inoperable, for example to allow for maintenance.

A single control system may control, at least in part (for example for purposes of redundancy), many fans. Each control system may be associated with only one or two fans. It may for example be that motors of the fans are paired, there being a pair of fans for brakes of pairs of wheels on the same axle on the landing gear. The supply of power and control of the fans may be arranged on a pair by pair basis. In such a case, it will be appreciated that the current drawn by a pair of motors will be greater than the current drawn by a single motor. Currents significantly greater than 1 A may be drawn by such a pair of motors when operating normally. It may therefore be appropriate to test whether or not a current of greater than (or less than) 3 A is being drawn by a pair of motors to determine whether or not there is a fault with one or both motors or their associated wiring.

Each fan may be associated with at least two control systems (for example for purposes of redundancy). The brake fan control system (which in use receives information relating to the frequency of the AC electrical power on the wild network and which then determines whether one or more brake cooling fans should be set in the operable mode or inoperable mode) may be a distributed system provided by separate component parts. For example, in the second embodiment, the aircraft control system 160 which provides an indication of whether or not the aircraft is on the ground could directly disable the power switches 150. In such a case, the brake fan control system could be viewed as including both the landing gear monitoring system 120 and the aircraft control system 160. The power switches 150 may include their own control/logic circuitry enabling such functionality. It may be that the power switches 150 require an independent signal that confirms that the aircraft in on the ground (i.e. independent of the "on-ground" signal received by the landing gear monitoring system 120 from the aircraft control system 160). There may be fault tracking and logging that extends to the status of the SSPS switches mentioned above. For example, the following events may be detectable: SSPS tripped, SSPS locked, SSPS failed, SSPS current flow, and no SSPS current flow. Data concerning the status of the SSPS switches may be available over the avionics data network. Such data can then be used to assess for failure of the associated brake fan(s).

The aircraft configuration (brake cooling fan option fitted) can be recorded by, and obtained from, software pin programming or hard-wired pin programming.

Redundancy in the system can be provided in various different ways. It may be that two systems for determining whether the brake cooling fans can be in an operable mode are provided, and that both must be in agreement for the brake cooling fans to be operable. An alternative would be to allow the transition between one mode (operable or inoperable) to be effected only if both systems are in agreement. It may be that the disabling of one or more fans requires only one system to issue a positive command to render the fan(s) inoperable.

Instead of blowing cooling air over the brakes, the or each fan may be arrange to draw hot air from the brakes and then exhaust it away from the brakes.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of cooling at least two aircraft wheel brakes on an aircraft, wherein the method includes:
    powering a plurality of brake cooling fans with AC power from a wild frequency power network on the aircraft, whilst ensuring that the frequency of the AC power meets certain criteria, wherein each of the plurality of brake cooling fan is associated with a different aircraft wheel brake of the at least two aircraft wheel brakes on the aircraft, and
    controlling one or more of the plurality of brake cooling fans independently of one or more of the other ones of the plurality of brake cooling fans.

2. The method according to claim 1, wherein the method includes a step of detecting that the one or more of the brake cooling fans, or parts associated therewith, is faulty, and then disabling operation of the one or more of the brake cooling fans independently of other of the brake cooling fans.

3. The method according to claim 1, wherein the method includes detecting a fault associated with one or more of the brake cooling fans, or associated with the current supplied to the one or more of the brake cooling fans, and then recording in an electronic log data descriptive of the detected fault.

4. The method according to claim 1, wherein the step of powering the plurality of brake cooling fans with AC power is performed automatically, under the control of a control system and in response to a determination that the certain criteria is met.

5. The method according to claim 1, further comprising receiving data via an electronic data communications network on the aircraft and using the data to assess whether or not to power the brake cooling fan with the AC power from the wild frequency power network.

6. The method according to claim 1, wherein the method includes a step of a control system determining whether or not to power the brake cooling fan in dependence on data received over an AFDX network on the aircraft, such data including data concerning the frequency of the AC power.

7. The method according to claim 1, wherein the step of ensuring that the frequency of the AC power meets the certain criteria includes assessing whether or not the frequency is less than a maximum amount.

8. The method according to claim 1, wherein the step of ensuring that the frequency of the AC power meets the certain criteria includes assessing whether or not the frequency has been less than a threshold amount for a certain period of time.

9. The method according to claim 1, wherein the step of powering the plurality of brake cooling fans with the AC power is performed in dependence on a measure of the temperature of one or more of the brakes to be cooled by the fans.

10. The method according to claim 1, wherein the step of controlling one or more of the brake cooling fans includes controlling at least one of the brake cooling fans in dependence on a measure of the temperature of the brake or brakes to be cooled by the fan.

11. A method of cooling an aircraft wheel brake on an aircraft, wherein the method includes a control system automatically powering a brake cooling fan with the AC power from a wild frequency power network on the aircraft in dependence on a measure of brake temperature whilst ensuring that the frequency of the AC power meets certain criteria.

12. The method according to claim 11, wherein the aircraft includes a plurality of brake cooling fans, and the method is performed such that each of the brake cooling fans of the plurality of fans is powered by the AC power from the wild frequency power network on the aircraft whilst ensuring that the frequency of the AC power meets a certain criteria.

13. The method according to claim 12, wherein the method includes a step of controlling one or more of the brake cooling fans independently of one or more of the other ones of the brake cooling fans.

14. The method according to claim 13, wherein the method includes a step of detecting that one or more of the brake cooling fans, or parts associated therewith, are faulty, and then disabling operation of the one or more of the brake cooling fans independently of other ones of the brake cooling fans.

15. The method according to claim 14, wherein the method includes detecting a fault associated with one or more of the brake cooling fans, or associated with the current supplied to one or more of the brake cooling fans, and then recording in an electronic log data descriptive of the fault.

16. A method to cool aircraft wheel brakes on an aircraft, the method includes:
 powering brake cooling fans with AC power from a wild frequency power network on the aircraft, wherein each of the powered brake cooling fan cools a different one of the aircraft wheel brakes;
 monitoring the frequency of the AC power;
 determining if the frequency meets a first criteria;
 shutting off power to all of the brake cooling fans if the frequency does not meet the first criteria;
 monitoring the brake cooling fans and determining whether each of the brake cooling fans meets a second criteria; and
 independently controlling at least one of the brake cooling fans separately of the other ones of the brake cooling fans based on whether the at least one of the brake cooling fans meets the second criteria.

17. The method according to claim 16, wherein the second criteria relates to a level of current flowing to each of the brake cooling fans.

18. The method according to claim 16, wherein the second criteria relates to a temperature of each of the wheel brakes, and the step of independently controlling at least one of the brake cooling fans includes shutting off AC power to the at least one of the brake cooling fans for which the associated wheel brake has a temperature lower than a threshold temperature.

19. A control system to cool aircraft wheel brakes on an aircraft, wherein a plurality of the aircraft wheel brakes are cooled by a respective brake cooling fans which are powered by a wild frequency power network on the aircraft, wherein the control system is configured to:
 power the brake cooling fans with AC power from the wild frequency power network on the aircraft, wherein each of the powered brake cooling fan cools a different one of the aircraft wheel brakes;
 monitor the frequency of the AC power;
 determine whether the frequency meets a first criteria;
 shut off power to all of the brake cooling fans if the frequency does not meet the first criteria;
 monitor the brake cooling fans and determine whether each of the brake cooling fans meets a second criteria; and
 independently control at least one of the brake cooling fans separately of the other ones of the brake cooling fans based on whether the at least one of the brake cooling fans meets the second criteria.

20. The control system according to claim 19, wherein the second criteria relates to a level of current flowing to each of the brake cooling fans.

21. The control system according to claim 19, wherein the second criteria relates to a temperature of each of the wheel brakes, and the control system is configured to independently control at least one of the brake cooling fans by shutting off the AC power to the at least one of the brake cooling fans for which the associated wheel brake has a temperature lower than a threshold temperature.

* * * * *